United States Patent
Sidle et al.

(10) Patent No.: US 9,195,830 B2
(45) Date of Patent: Nov. 24, 2015

(54) SYSTEM AND METHOD FOR UNATTENDED COMPUTER SYSTEM ACCESS

(75) Inventors: James Ben Sidle, Perth (GB); Bernard Parsons, London (GB); Nigel Lee, Herts (GB); Gordon Parrott, Herts (GB)

(73) Assignee: BeCrypt Limited, London (GB)

( * ) Notice: Subject to any disclaimer, the term of this patent is extended or adjusted under 35 U.S.C. 154(b) by 524 days.

(21) Appl. No.: 13/074,452

(22) Filed: Mar. 29, 2011

(65) Prior Publication Data

US 2011/0246773 A1 Oct. 6, 2011

(30) Foreign Application Priority Data

Mar. 31, 2010 (GB) .................................. 1005479.9

(51) Int. Cl.
*H04L 9/32* (2006.01)
*G06F 21/57* (2013.01)
*G06F 21/30* (2013.01)
*G06F 21/80* (2013.01)

(52) U.S. Cl.
CPC ............... *G06F 21/57* (2013.01); *G06F 21/305* (2013.01); *G06F 21/80* (2013.01)

(58) Field of Classification Search
CPC ........ G06F 21/305; G06F 21/80; G06F 21/57
See application file for complete search history.

(56) References Cited

U.S. PATENT DOCUMENTS

| | | | |
|---|---|---|---|
| 6,834,351 B1* | 12/2004 | Kabenjian | 726/9 |
| 2006/0126603 A1* | 6/2006 | Shimizu et al. | 370/356 |
| 2006/0179293 A1 | 8/2006 | O'Connor et al. | |
| 2007/0022285 A1* | 1/2007 | Groth et al. | 713/155 |
| 2009/0271606 A1 | 10/2009 | Sugano | |

FOREIGN PATENT DOCUMENTS

| | | |
|---|---|---|
| EP | 1 491 983 | 12/2004 |
| EP | 2 169 908 | 3/2010 |

* cited by examiner

*Primary Examiner* — Brandon Hoffman
*Assistant Examiner* — Nega Woldemariam
(74) *Attorney, Agent, or Firm* — Leason Ellis LLP

(57) ABSTRACT

A secure access system, method and patch management system for access to a remote computer system is disclosed. The remote computer system requires local authentication to boot an operating system. A client module is arranged to be executed on the remote computer system upon booting of the computer system and is arranged upon execution to obtain access data over a network from an authentication system for access to the computer system and to use said access data to perform said local authentication at the remote computer system and boot said operating system. The authentication system being arranged to said store access data for the remote computer system in a data repository and being responsive to provide said access data to said client module over the network upon authentication of a request from the client module.

20 Claims, 1 Drawing Sheet

SYSTEM AND METHOD FOR UNATTENDED COMPUTER SYSTEM ACCESS

FIELD OF THE INVENTION

The present invention relates to a system and method for unattended computer system access and in particular for unattended access to secure computer systems such as those protected by full disk encryption.

BACKGROUND TO THE INVENTION

There is an increasing desire, particularly in enterprises, to secure access to the content of computer systems using security systems such as full disk encryption. Full disk encryption (also called whole disk encryption) uses encryption software and/or hardware to encrypt all data (normally with the exception of a small footprint boot program) on a physical storage medium such as a hard disk. Full Disk Encryption prevents unauthorized access to data storage without knowledge of the decryption key. It cannot be booted without the key, nor could it be pulled from the computer system and accessed elsewhere without that key.

A security front end sits in front of any operating system on the physical storage medium and prevents access to the operating system (which is itself encrypted) without authentication. Booting of the computer system results the secure front end being loaded and only upon successful user authentication is the disk decrypted and the operating system booted. The authentication may be linked to hardware such as a trusted platform module (TPM) in the computer system.

There are various advantages of full disk encryption. Not least, the computer and its operating system is rendered inaccessible without the decryption key. Any data stored locally is unintelligible and the computer's value to a would-be thief is significantly reduced as there is no opportunity to retrieve the data for phishing, blackmail etc, nor is the computer itself useable without being wiped and a new operating system installed. Full disk encryption is proving exceptionally popular for mobile workers who carry portable computers. However, there is also an increasing trend to secure desktop PCs and even servers (particularly in branch offices where physical security may not be ideal) with mechanisms such as full disk encryption.

Whilst systems such as full disk encryption enable an enterprise to secure access to a computer system without prior authentication, they also have negative side-effects.

One particular issue is in patching and update management. Patches are typically fixes for a specific product, addressing a security-vulnerability. Updates may also address security vulnerabilities, although they may also provide changes to functionality.

Patching and update management is the process of controlling the deployment and maintenance of interim software releases into production environments. It helps to maintain operational efficiency and effectiveness, overcome security vulnerabilities, and maintain the stability of the production environment. Patching and applying updates to software and operating systems is vital in today's environment where manufacturers often have to issue patches/updates in response to newly publicized exploits. Anti-virus/malware suite providers and application vendors are typically slower than virus and malware writers to react to new exploits and this makes it all the more important that patches, antivirus signature files and updates are rolled out as soon as possible to cut short the head start that virus and malware writers have often been given. The rise of widespread worms and malicious code targeting known vulnerabilities on unpatched systems, and the resultant downtime and expense they bring, is probably the biggest reason so many organizations are focusing on patch management.

Patch management systems are designed to assist an administrator in distributing one or more software updates, or patches, to a number of computer systems substantially simultaneously. The software update process is often done in the background so that a user of the computer system is not affected by the update. However, patching and updating is not always completely unobtrusive and can require reboots, closing of applications and general performance slow-downs which are not desirable when a user is attempting to do their day to day work.

It is common for patching, updates and other IT maintenance to be done out of working hours to avoid interrupting the workforce and losing time that could otherwise be spent bringing in revenue. In many enterprises, unattended out of hours patching and updates is achieved by using systems such as wake-up on Lan (WOL) in which computer systems can be shut down by users at the end of their working day but later automatically (and/or remotely) woken by special WOL commands transmitted over the network, patched and then shut down again. This keeps power usage as low as possible and also avoids a computer system being left on overnight which would risk its security could be compromised by cleaning staff, intruders etc. Unless there are significant or unpredictable patches or updates to be applied, it also means that the process can be automated and unattended and the IT support department need merely review a patching report the following morning to identify problems.

However, it will be appreciated that the desire to shut computer systems down at the end of the day conflicts with the desire to perform IT maintenance out of hours. While WOL previously was able to side step this issue, the advent of security such as TPMs and full disk encryption means that even if a secure computer system that is woken by a WOL command, authentication credentials must still be provided to the security front end to enable access to the operating system to be patched/updated. It would be a severe security risk to send those credentials over a network (or store them locally for access or simply "trust" the patch/update system). This results in a stalemate. From a security perspective, secure authentication is desirable. From a maintenance perspective, unattended access is desirable.

Similar problems apply to hosted data centre environments where servers and other computer systems may be at physically remote sites from users and their IT support staff. While datacenters are accessible to those renting rack space, some charge for this privilege and even where there is no charge there is significant inconvenience of sending someone out to the datacenter.

STATEMENT OF INVENTION

According to an aspect of the present invention, there is provided a secure access system for access to a computer system, the computer system being arranged to require local authentication to boot an operating system, the secure access system comprising an authentication system and a client module, wherein:

the client module is arranged to be executed on the computer system upon booting of the computer system and is arranged upon execution to obtain access data over a network from the authentication system for access to the computer system and to use said access data to perform said local authentication and boot said operating system;

the authentication system being arranged to said store access data for the computer system in a data repository and being responsive to provide said access data to said client module over the network upon authentication of a request from the client module.

Embodiments of the present invention seek to provide the capability of "unattended" boot-up for a machine (whether that be a Laptop, Desktop or Server) that is protected with security such as full disk encryption. Currently, full disk encryption and similar security approaches requires user interaction at "pre-boot" to authenticate before the machine boots the Operating System.

As previously discussed, this poses a number of problems for an enterprise that wishes to deploy such technology across their IT infrastructure including:

Machines that are used for hot desking would require ALL users to be registered at pre-boot (this is not practical for most organisations).

Patch management becomes problematic as most organisations push out updates/patches overnight when machines are powered off. They are configured for Wake-on-LAN power up and where full disk encryption is applied they would sit waiting for authentication at pre-boot and would be unable to install the update/patch.

Server deployments would be difficult as most organisations run their servers in "lights out" data centres where there is no user interaction with the servers during reboots.

All currently known full disk encryption products (and many hardware pre-boot authentication schemes) suffer from the issues outlined above. Embodiments of the present invention seek to address this in a manner that is also secure and transparent to the User.

From a formal security threat perspective, the secure access system ensures that if a machine is stolen from the controlled environment with network key authentication enabled, the encryption present on the machine is not compromised. This means that security measures are not compromised by network key authentication and the advantages of unattended authentication are not diminished by a risk that the machine may be stolen in a compromised state (when in unattended boot for updates etc). It will be appreciated that this is far better than simply writing the disk encryption key in plain text or in some cases slightly obfuscated on disk, as is done in some other systems.

At least a portion of the steps described herein are performed by a process defined by code executing within a processor of a computer. The code can comprise software instructions that are provided to a physical memory that is accessible to the processor of the computer.

BRIEF DESCRIPTION OF THE DRAWINGS

Embodiments of the present invention will now be described in detail, by way of example only, with reference to the accompanying drawings in which.

DETAILED DESCRIPTION

Figure 1:
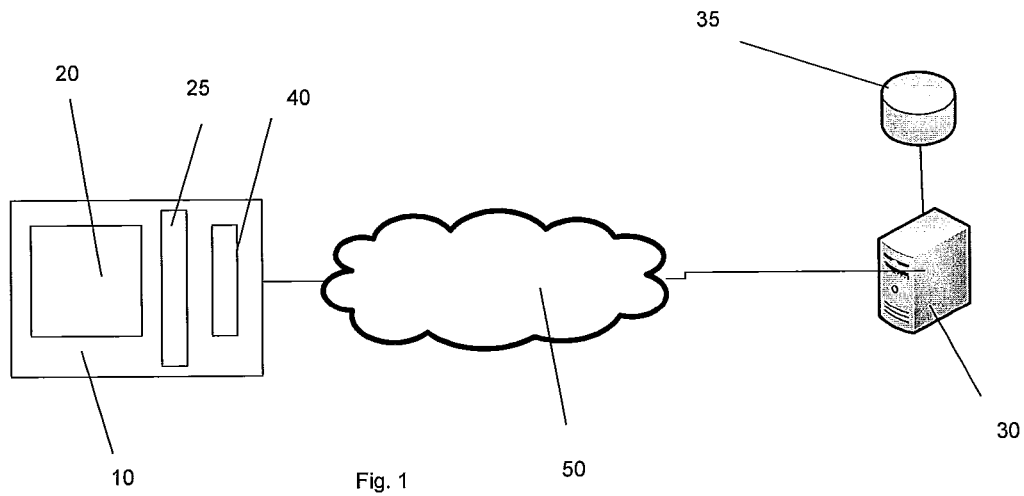
FIG. 1 is a schematic diagram of a secure access system for access to a computer system according to an embodiment of the present invention; and, FIG. 2 is a diagram illustrating the password and key exchange process.

FIG. 1 is a schematic diagram of a secure access system for access to a computer system according to an embodiment of the present invention.

The computer system 10 is arranged to require local authentication to boot an operating system. In this embodiment, local authentication is enforced by the fact that the hard disk 20 storing the operating system is encrypted and can only be accessed by authenticating with a security system 25. It will be appreciated that other forms of local authentication can be used. The secure access system comprises an authentication system 30 and a client module 40.

The client module 40 is arranged to be executed on the computer system 10 upon booting of the computer system 10 and is arranged upon execution to obtain access data over a network 50 from the authentication system 30 for access to the computer system 10 and to use said access data to perform said local authentication (authenticating with the security system 25 to decrypt the operating system from the disk 20) and boot said operating system.

The authentication system 30 is arranged to the store access data for the computer system in a data repository 35 and is responsive to provide the access data for the computer system 10 to the client module 40 over the network 50 upon authentication of a request by the client module 40.

The authentication system 30 is intended to be a light weight standalone server for authorising authentication requests. The authentication system may be integrated or interfaced with other systems of components such as network authentication, patching systems etc.

To provide greater flexibility and security to an organisation running the authentication system 30, a granular policy-based approach is preferably applied to authorising machines when booted from the network. Machines can be authorised based on a number of attributes, such as, Client GUID, Time of day, or Day of week. For example, an organisation might only to allow booting from the network during core business hours (ie. 8 am-6 pm). This could help prevent against "unauthorised" access of a machine by somebody who broke into to steal a machine outside of business hours. Another example could be for disallowing any machine in a particular branch office from network booting because of poor physical access control.

The authentication system 30 can run in either stand-alone mode or as an agent (obtaining authorisation and credentials from another potentially remote source). Optionally, the authentication system 30 may check to see if a master authentication system is active, and forwards all authorisation requests to the master authentication system in such a case and otherwise processing requests against a local policy.

A number of implementation decisions arise regarding scalability and availability. This could be achieved by Network Load Balancers with multiple authentication systems 30 running (using database replication between them) or another approach could be to use clustering services both on the authentication system 30 and database.

Various steps are involved in registering a new machine 10 with the authentication system 30 before it can successfully boot without user interaction.

The client module 40 is installed on the machine 10. During the installation process, a request message 10a is generated by the client module 40 which includes the following data:

Protocol identifier
Protocol version
Request type
Time stamp (used to detect replays)
Nonce (used to detect replays)
Client's certificates
Hash of server's public key
Guid of the client.

Signature

The entire message (apart from the signature field) is signed by the client's private key.

The client module 40 establishes a TCP connection (this could be over TLS or IPsec to enforce authorised end-point connections) to the authentication system 30 and sends the request message 10a over the network 50 to the authentication system 30. Upon receipt, the authentication system 30 processes the request message and replies with a response message which includes the following data:

Protocol identifier
Protocol version
Response type
Error code
Nonce (same as in the clients request)
Server's certificates (if the server's key doesn't match the one the client was expecting)
Signature The entire message (apart from the signature field) is signed by the server's private key.

It is possible that the client has the wrong public key for the server (E.g. if there are multiple servers with different keys or the server's certificate has expired). In either of these cases the server will respond with a response containing its certificates. The client will then send a new request on the same TCP connection (it is important to use the same connection, so that the same server will be accessed).

Any Machine can request registration with the authentication system 30 but registration is preferably policy-based and the policy will determine whether a Machine can be enrolled to use network key authentication to boot or not. As an example, where machines within a specific organisational department are identifiable, a policy may be defined to prohibit network key authentication for a specific department, or alternatively to allow only network key authentication for that department.

Preferably, the client module is integrated or interfaced with a client for a security system that is operational on the machine 10. For example, the security system may be a full disk encryption system such as Becrypt's DISK protect product or Microsoft's Bitlocker®.

The client module is configured with:
The IP address of the authentication system 30 (either actual IP address or DNS resolution)
The authentication system 30's Public Key
The Machine's IP address (either static IP or DHCP)

If the Registration was successful then the client module 40 is configured for unattended Network Key Authentication and a machine password and network key change is performed.

Figure 2:
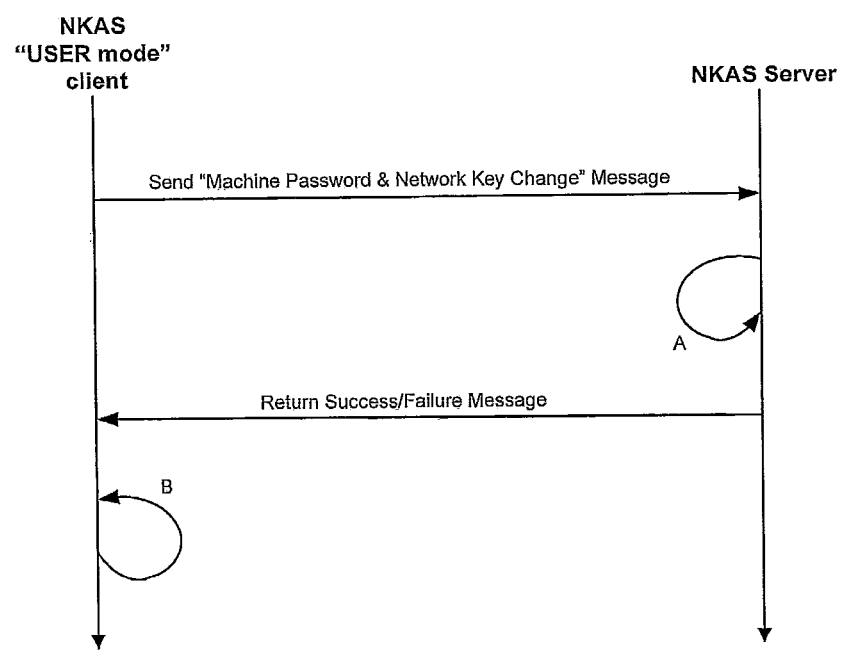

FIG. 2 is a diagram illustrating the password and key exchange process.

The client module 40 establishes a TCP connection (this could be over TLS or IPsec to enforce authorised end-point connections) to the authentication system 30 and sends a machine password & network key change request. The message exchange allows the client and server to share some random data (in this example it is 128 bytes but could be of differing lengths).

The client module sends a request containing the following fields:
Protocol identifier
Protocol version
Request type
Time stamp (used to detect replays)
Nonce (used to detect replays)
Client's certificates
Hash of server's public key
Guid of the client.
Encrypted Random data (64 bytes)
Signature The random data is encrypted with the server's public key.
The entire message (apart from the signature field) is signed by the client module's private key.

As indicated at arrow A in FIG. 2, the server generates 64 bytes of random data and combines this with the 64 bytes of random data from the Client to initialize a Pseudo Random Number Generator to create the data items shown above. The session ID, password, and network key noted above are fields saved by the server in its database. The server returns SUCCESS if the write to the database succeeds. As indicated by arrow B in FIG. 2, the Client adds 64 bytes of random data and combines this with the 64 bytes of random data from the Server to initialize a Pseudo Random Number Generator to create the data items shown above. The session ID, password, and network key noted above are saved by the client in encrypted space on the disk.

The authentication system 30 responds with a message containing the following fields:
Protocol identifier
Protocol version
Response type
Error code
Nonce (same as in the clients request)
Server's certificates (if the server's key doesn't match the one the client was expecting)
Expiration time for this network password.
Random data (64 bytes) (If the certificates are NOT present)
Signature The random data is encrypted with the client module's public key.
The entire message (apart from the signature field) is signed by the authentication system's private key.

This random data is used in both client module and authentication system to initialise a Pseudo Random Number Generator (PRNG). This PRNG is used to create the following data items (all are fixed length binary data):
Session ID (16 bytes)
Password (32 bytes)
Network Key (32 bytes) (Network Transmission AES Key)

The authentication system 30 server saves all these fields in its data repository 35 (which may be a local database, some other form of repository or some remote secure repository or facility), for future use.

The client module 40 saves the Session ID and Network Key in unencrypted space on its local disk. The client also creates an additional random data (32 bytes). The client uses the password, the additional random data and some disk parameters to create a KEK (Key Encryption Key). This KEK is used to encrypt a DEK (Disk Encryption Key), and the result (the encrypted DEK) is stored in unencrypted space on the disk (along with the additional random data). The client then erases its password.

Periodically the client system can renew its key information. This would allow an expiration time to be place on all data in the key server. It would also provide a mechanism to recover from failures in the key server.

The PRNG is used to ensure that neither the client nor server could choose particular values for the generated values. Using random data from two sources also ensures a greater confidence in the strength of the entropy used.

The DEK encrypted by the KEK could be stored in one of the user table entries. This would then indicate to the security system on the machine that the machine was booted automatically. The user table entry would use a reserved username. The user table entry should have a new flag to indicate this (the hash of the username is unlikely to be sufficient—there could be valid usernames which hash to the same value).

FIG. 1 is a schematic diagram of an embodiment of the present invention during an unattended boot operation.

On boot of the machine 10, the client module 40 (which is configured to be executed as part of the boot operations) sends a machine authentication message (which is preferably a fixed length binary message) over UDP to the authentication system 30. This message contains the Session ID for the client module 40.

The request preferably contains the following data:
Protocol Identifier
Protocol Version number
Request Type
Session ID
A nonce (to protect against replay attacks)
Signature The Signature is generated using the shared Network Transmission AES Key belonging to the given Session ID. It is a signature of the entire message excluding the signature itself.

The message fields up to the Session ID are transmitted in clear—other fields can be encrypted. (A combination of XEX/OCBI/PMACI are preferably used to do this. It allows for arbitrary length messages, with both encrypted and unencrypted parts protected by a mac. It is based on AES).

Upon receipt, the authentication system 30 uses the Session ID to:
 a) Check if the Machine is "registered" and "authorised" to boot from the Network.
 b) Retrieve the unique Network Transmission AES Key and the Machine Password The authentication system 30 returns a response message (either Success/Failure) to the requesting client module 40 (with the Machine Password encrypted with the Network Transmission AES Key).

The response preferably contains the following items:
Protocol Identifier
Protocol Version number
Response Type
Success/Error code
Session ID
The same nonce that was in the request
The 'password' encrypted with the Network Transmission AES
Key
Signature The Signature is the same as for the request. The 'password' field must be encrypted, but other fields could be in clear.

Upon receipt of a Success Response the client module 40 decrypts the Machine Password and then reconstructs the KEK (using password, random data and disk parameters) which is then used to recover the DEK which is then used to decrypt the encrypted disk and boot the operating system for applying patches etc.

If the pre-boot "Network Authentication" module either receives a Failure response or cannot connect to the authentication system 30 (whether the Machine is not connected to the network or timeouts) then the standard pre-boot authentication mode is used.

The User table may optionally have increased security applied. At present it is possible to modify the table (e.g. to grant admin rights to an existing user). One way of increasing security would be to use a keyed hash (using the DEK).

However, in principle anyone who has user access to the system would still be able to modify the table. It would also be possible to store a copy of the table in a protected file inside the operating system. This could be checked when the system boots—but it would cause a problem for offline tools which might want to update the table.

The client module 40 could optionally invalidate the existing network boot data as soon as it boots (e.g. by erasing the random data or session id or network key or encrypted DEK). Alternatively, it could delay this until it has negotiated new data with the server. Similarly, it could delay rekeying with the server (E.g. until just before a scheduled shutdown). Early erasure and delayed re-keying would reduce the time window when the system is vulnerable to attack, but would also mean there are times when unattended reboot is not possible.

It is to be appreciated that certain embodiments of the invention as discussed below may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

The invention claimed is:

1. A secure access system for access to a remote computer system, the remote computer system having a processor and an encrypted storage medium storing an operating system, the processor of the remote computer system being configured to execute computer program code to operate the remote computer in a first mode to require local presentation and authentication of credentials by a user at the remote computer to boot the operating system, wherein the local authentication is performed without reference to a system external to the remote computer and wherein successful local authentication causes the processor to execute computer program code to decrypt the encrypted storage medium to enable booting of the operating system, the secure access system comprising an authentication system and a client module, wherein:

upon receiving a boot request over a data communications network, the processor of the remote computer system is configured to execute computer program code to operate the remote computer system in a second mode including executing computer program code to execute the client module upon booting of the computer system, the computer program code being configured upon execution to obtain access data over a network from the authentication system for access to the computer system and to use said access data to perform said local authentication at the remote computer system, cause decryption of the operating system and boot said operating system;

the authentication system being arranged to said store access data for the remote computer system in a data repository and being responsive to provide said access data to said client module over the network upon authentication of a request from the client module.

2. A secure access system according to claim 1, wherein the remote computer system is arranged to store an encrypted decryption key for the encrypted storage medium in a local non-encrypted storage medium, the client module being arranged to use the access data in decrypting the encrypted decryption key.

3. A secure access system according to claim 1, wherein the authentication system is arranged to apply a granular policy to authentication of a request.

4. A secure access system according to claim 3, wherein the granular policy is based on one or more attributes including: remote computer system identifier, group membership of the remote computer system, location of the remote computer system, time of day, day of week.

5. The secure access system of claim 4, wherein the authentication system is configured to provide said access data upon the request meeting the granular policy attributes.

6. A secure access system according to claim 1 wherein the secure access system is arranged to trigger a wake-on-LAN power up over a network to boot the remote computer system.

7. The secure access system of claim 1, wherein the remote computer system encodes key data for decrypting the encrypted storage medium, the processor being configured to execute computer program code to retrieve the key data for decrypting the encrypted storage medium upon local authentication at the remote computer system.

8. The secure access system of claim 7, wherein the remote computer system includes a Key Encryption Key, the key data for decrypting the encrypted storage medium being encrypted using the Key Encryption Key and stored in unencrypted space on a storage medium of the remote computing device, wherein upon receipt of the access data the processor is configured to execute computer program code to use the access data at the remote computer system to reconstruct the Key Encryption Key for decrypting the key data.

9. The secure access system of claim 1, further comprising wherein the processor of the remote computer system is further configured to execute computer program code to invalidate the access data upon booting of the operating system.

10. The secure access system of claim 9, further comprising the processor executing computer program code to negotiate new access data with the authentication system.

11. The secure access system of claim 1, wherein the processor of the remote computer system is further configured to execute computer program code to decrypt the encrypted storage medium and boot the operating system upon local authentication without receiving access data from the authentication system.

12. A computer implemented method for providing secure access to a remote computer system, the remote computer system including an encrypted storage medium storing an operating system and being arranged to require local authentication at the remote computer system for decrypting the operating system to enable booting boot an operating system, the method comprising:

operating the remote computer in a first mode to receive credentials from a user at the remote computer system, authenticate the credentials without reference to a system external to the remote computer system and, upon successful authentication, cause decryption of the encrypted storage medium to enable booting of the operating system;

operating the remote computer system in a second mode upon receiving a boot request over a data communications network, including:
causing activation of the remote computer system and causing execution of a client module at the remote computer system prior to boot of the operating system at, the remote computer system;
receiving an authentication message from the remote computer system, the authentication message including a Session ID for the client module;
authenticating the authentication message and providing access data for the remote computer system to said client module over the network upon authentication of the authentication message,
the access data being arranged to cause the client module to complete local authentication including causing decryption of the operating system and boot the operating system of the remote computer system.

13. A computer implemented method according to claim 12, further comprising storing at the remote computer system an encrypted decryption key for the encrypted storage medium in a local non-encrypted storage medium, the step of causing decryption comprising using the access data in decrypting the encrypted decryption key.

14. A computer implemented method according to claim 12, wherein the access data includes an encrypted password, the step of using the access data including decrypting the password and generating a further decryption key to decrypt the encrypted decryption key from data including the password.

15. A computer implemented method according to claim 12, wherein the step of authenticating a request includes applying a granular policy to determine authentication of the request.

16. A computer implemented method according to claim 15, wherein the granular policy is based on one or more attributes including: remote computer system identifier, group membership of the remote computer system, location of the remote computer system, time of day, day of week.

17. A computer implemented method according to claim 12, wherein step of causing activation includes triggering over a network a wake-on-LAN power up of the remote computer system.

18. A patch management system for patching of a remote computer system, the remote computer system having a processor and an encrypted storage medium storing an operating system, the processor of the remote computer system being configured to operate the remote computer system in a first mode to execute computer program code to require local authentication at the remote computer system by presentation of credentials from a user at the remote computer system, wherein the local authentication is without reference to a system external to the remote computer, for decrypting the operating system to boot the operating system, the patch management system comprising an authentication system and a client module, wherein:

the patch management system is arranged to trigger activation of the remote computer system by transmitting a boot request over a data communications network;

upon receiving a boot request over the data communications network from the patch management system, the processor of the remote computer system being configured to operate the remote computer system in a second mode to execute computer program code to execute the client module prior to booting of the operating system at the remote computer system, the computer program code being configured upon execution to obtain access data over a network from the authentication system for access to the computer system and to use said access data to perform said local authentication, cause decryption of the operating system and boot said operating system;

the authentication system being arranged to said store access data for the computer system in a data repository and being responsive to provide said access data to said client module over the network upon authentication of a request from the client module, upon booting of the operating system using the access data, the patch management system being arranged to patch the remote computer system and deactivate the computer system.

19. A patch management system according to claim 18, wherein activation of the computer system comprises triggering a wake-on-LAN power up and deactivation comprises triggering a shutdown of the remote computer system.

20. A patch management system according to claim 18, wherein activation comprises triggering a resume from standby state of the remote computer system and deactivation comprises triggering a suspend to standby state of the remote computer system.

* * * * *